Patented May 25, 1954

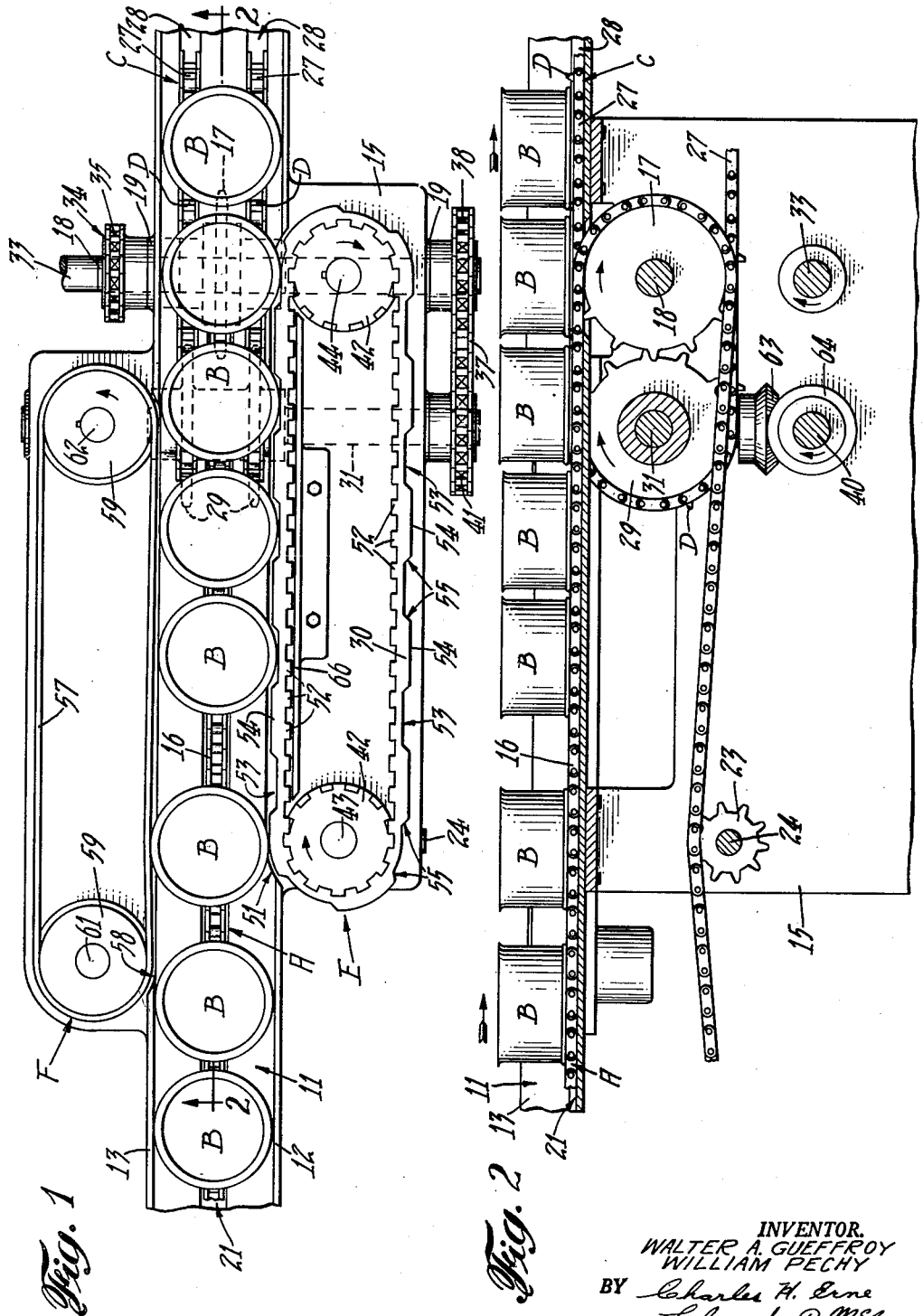

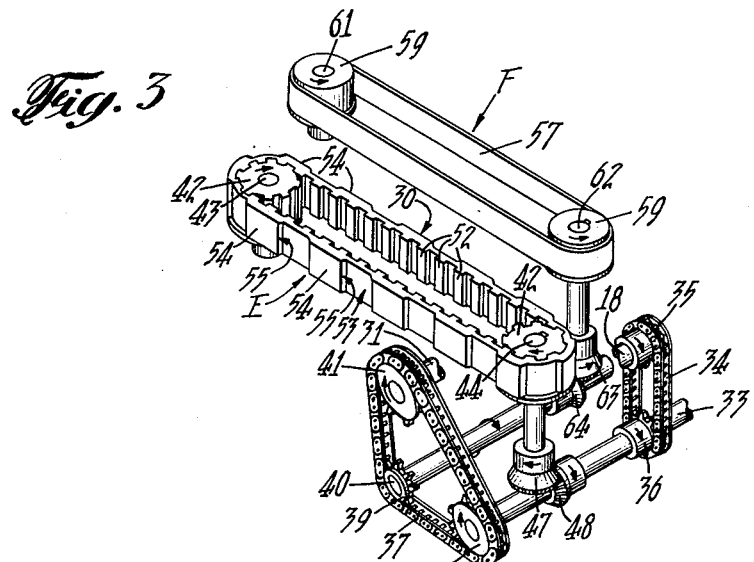
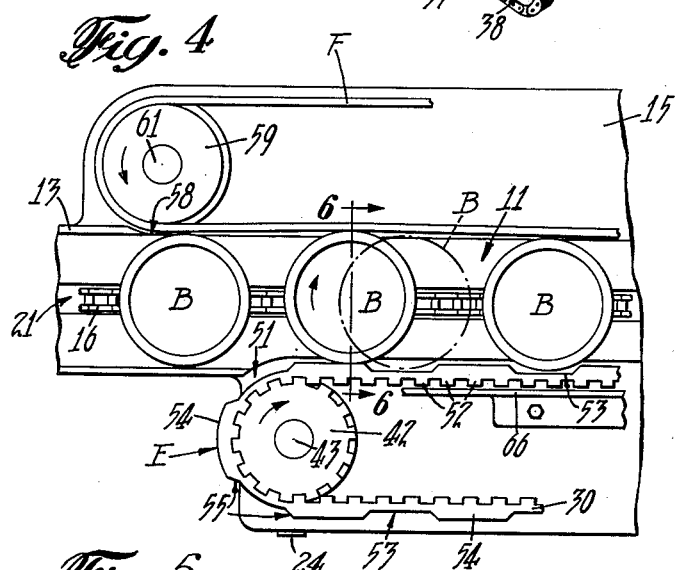
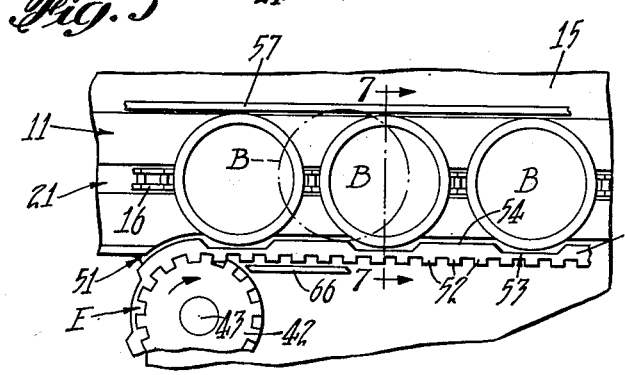
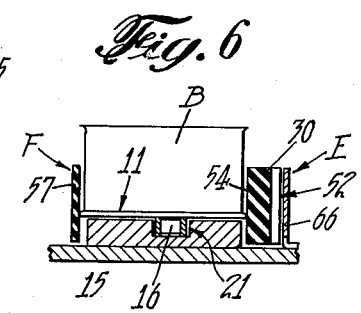
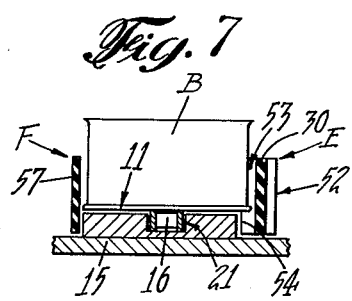

2,679,313

UNITED STATES PATENT OFFICE 2,679,313

APPARATUS FOR TIMING AND FEEDING ARTICLES

Walter A. Gueffroy, Roslyn Heights, N. Y., and William Pechy, Belmar, N. J., assignors to American Can Company, New York, N. Y., a corporation of New Jersey Application December 11, 1952, Serial No. 325,473

5 Claims. (Cl. 198—34)

The present invention relates to an apparatus for feeding articles such as cans or containers moving along a straight line path of travel in processional order into a timed feeding conveyor of a subsequent operation machine and has particular reference to a timing and indexing device for repositioning or relocating random spaced untimed articles, by advancing them into proper position, to coordinate them with the timed feeding conveyor for proper delivery thereto. This is a companion application to my copending United States application Serial No. 325,471 filed December 11, 1952, on Apparatus for Timing and Feeding Articles, and United States application Serial No. 325,472 filed December 11, 1952, on Apparatus for Timing and Feeding Articles.

The invention contemplates the provision of a can or container timing and indexing device for use with a conveyor, preferably a straight line conveyor adapted to receive the cans or containers in random spaced and untimed relation from a source of supply such as a filling table where the cans are filled manually, and to deliver them in timed and processional order to an automatic machine such as a can or container closing machine.

An object of the invention is the provision in a straight line conveyor apparatus of a timing and indexing device wherein random spaced untimed articles moving in processional order may be readily repositioned in timed and properly spaced order for proper reception by a timed feeding mechanism of a subsequent operation machine without arresting the travel of the articles.

Another object is to provide such a device which will space and feed mispositioned or untimed cans with a minimum of jarring or disturbance to the contents of the cans, so that the device may be used to advance open top liquid filled cans.

Another object is to provide such a device which will keep the mispositioned cans in continuous motion with merely a gentle accelerating action thereof during the repositioning operation for a controlled release at the proper time, of the cans to be received by the subsequent operation machine.

Numerous other objects and advantages of the invention will be apparent as it is better understood from the following description, which, taken in connection with the accompanying drawings, discloses a preferred embodiment thereof.

Referring to the drawings:

Figure 1 is a plan view of a conveyor mechanism embodying the timing and indexing device of the present invention, with parts broken away;

Fig. 2 is a longitudinal sectional view taken substantially along the line 2—2 in Fig. 1, parts being broken away;

Fig. 3 is a reduced scale perspective schematic view showing parts of the timing and indexing mechanism and their driving elements, with parts broken away;

Figs. 4 and 5 are fragmentary plan views of the portion of the apparatus shown at the left in Fig. 1 and illustrating how out-of-time cans are repositioned in properly timed relation; and Figs. 6 and 7 are sectional views taken substantially along the lines 6—6, 7—7 in Figs. 4 and 5 respectively.

As a preferred or exemplary embodiment of the instant invention the drawings illustrate principal parts of a conventional straight line transfer conveyor A (Fig. 1) carrying random spaced, open top, liquid filled cylindrical cans B in processional order toward a connecting timed feeding conveyor C having spaced feed dogs D of a subsequent operation machine, with a timing and indexing device E and an auxiliary timing device F disposed adjacent the transfer conveyor A on opposite sides thereof for respacing and timing the untimed cans B on the conveyor A for proper delivery into the feeding conveyor C in time with the advancement of its feed dogs D in a manner which prevents spilling of the liquid contents of the cans. Although the drawings show the subsequent operation machine feeding conveyor C having spaced feed dogs D for receiving and propelling the timed cans B into the machine, the invention is equally well adapted to timing the cans B for entrance into a conventional feed worm, star wheel or other suitable feeding element.

The open, filled cans B, in an upright position, are advanced continuously through the apparatus in a horizontally disposed straight line open runway 11 having longitudinal, spaced and parallel, guide rails 12, 13 for guiding the cans along a straight line path of travel in processional order. The runway 11 is supported on a frame 15 which constitutes the main frame of the apparatus.

The transfer conveyor A, which receives the cans B from any suitable source of supply such as a previous operation machine or filling table which discharges them in random spacings, preferably comprises a single endless chain 16 which extends from the previous operation machine or table and which operates over a sprocket 17 mounted on a horizontally disposed transverse shaft 18 (Figs. 1, 2 and 3) journaled in a pair of spaced bearings 19 formed in the frame 15. The shaft 18 is rotated continuously in time with the feeding conveyor C and the timing and indexing device E in a manner which will be hereinafter explained.

The upper run of the transfer chain 16 operates in a longitudinal groove 21 (see also Figs. 4, 5, 6 and 7) formed in the floor of the runway 11, the groove 21 having a uniform depth slightly less than the depth of the chain so that the chain projects slightly above the floor of the runway to support the cans clear of the floor. The lower run of the chain 16 operates over an idler sprocket 23 (Figs. 1 and 2) mounted on a transverse shaft 24 carried in suitable bearings formed in the frame 15. The transfer chain 16 has no feed dogs or other means of propelling the random spaced cans B carried thereon and depends solely upon the frictional engagement between the bottoms of the cans and the chain to advance the cans along the runway 11.

The feeding conveyor C having the spaced feeding dogs D, which receives the cans B from the transfer conveyor A, preferably comprises a pair of transversely spaced and parallel endless chains 27 (Figs. 1 and 2) disposed in a horizontal position, one on each side of the discharge end of the transfer conveyor A. The upper runs of the chains 27 operate in a pair of spaced and parallel grooves 28 formed in the floor of the runway 11, the grooves 28 having a uniform depth slightly less than the depth of the chains so that the chains project slightly above the floor of the runway to support the cans B clear of the floor.

Adjacent the discharge end of the transfer conveyor A, the chains 27 of the feeding conveyor C overlap the transfer conveyor and operate over a pair of spaced and parallel sprockets 29 (Figs. 1 and 2) mounted on a transverse horizontal shaft 31 (see also Fig. 3) journaled in a pair of spaced bearings, similar to the bearings 19, in the frame 15. This feeding conveyor shaft 31 and the transfer conveyor shaft 18 are rotated in synchronism and at substantially the same linear speed by connection with a main driving shaft 33 (Figs. 2 and 3) which is parallel with and is disposed beneath the sprocket shaft 18. The driving shaft 33 is journaled in suitable bearings in the frame 15 and is driven in any suitable manner preferably by connection with the subsequent operation machine.

The sprocket shaft 18 is driven from the main driving shaft 33 by an endless chain 34 which operates over a sprocket 35 on the shaft 18 and a sprocket 36 on the driving shaft 33. The sprocket shaft 31 is driven by an endless chain 37 which operates over three sprockets, a sprocket 38 on the driving shaft 33, a sprocket 39 on a gear shaft 40 journaled in suitable bearings in the frame 15, and a sprocket 41 on the sprocket shaft 31.

The timing and indexing device E is disposed adjacent the transfer conveyor A preferably near the discharge end of the conveyor and includes a horizontally disposed endless belt 30 (Figs. 1, 3, 4, 5, 6, and 7) which operates over a pair of spaced toothed pulleys 42 mounted on a pair of spaced and parallel vertical shafts 43, 44 disposed adjacent the runway 11 and journaled in bearings in the frame 15. The shaft 44 is the driving shaft and carries a bevel gear 47 which meshes with and is driven by a bevel gear 48 keyed to and rotating with the main driving shaft 33. In this manner the timing belt 30 is operated continuously in synchronism with and at substantially the same linear speed as the transfer conveyor A. The inner run of the timing belt 30 extends along one side of the runway 11 and projects into the runway where it travels in the path of the cans B advancing along the runway. For this purpose the side guide 12 of the runway is cut away and formed with an opening 51 (Fig. 1) to admit the belt.

The timing belt 30 preferably is made of a resilient material, such as rubber, and its inner face is formed with transverse teeth 52 for meshing engagement with the teeth on the pulleys 42 to drive the belt without slippage on the pulleys to keep the belt in timed relation with the transfer conveyor A. The outer face of the belt is formed with a plurality of spaced transverse clearance recesses 53 which set off between them flat lands or projections 54. The transverse edges of the lands 54 preferably are formed with beveled portions 55 which extend into the recesses 53.

The recesses 53 in the timing belt 30 are spaced apart a distance substantially equal to the longitudinal distance between the feed dogs D on the feeding conveyor C, and are located in the belt in timed relation to the feed dogs D on the feeding conveyor. The recesses 53 also are of a width to just clear a can in the runway 11, without engaging it as shown in Figs. 5 and 7 so that any can which is being advanced through the runway 11 by the transfer conveyor A and which is by chance in properly timed relation to the feed dogs D on the feeding conveyor C, will enter one of the recesses 53 on the timing belt 30 as shown in Fig. 5 and will continue to advance with the transfer conveyor A without interference while remaining in its recess 53 in the moving timing belt 30 and so will be carried forward onto the feeding conveyor C in proper time in front of a pair of the feed dogs D for further advancement into the subsequent operation machine without having its forward movement arrested at any time.

When a can B is not in this properly timed position on the transfer conveyor A, such as when the cans are irregularly spaced and out of time, the can does not enter one of the recesses 53 on the timing belt 30, but is engaged by one of the lands 54 as shown in Figs. 1 and 4 and is compressed or wedged between the land and the auxiliary timing device F.

The auxiliary timing device F comprises a smooth endless belt 57 (Figs. 1 and 3) which is disposed parallel to and opposite the timing and indexing belt 30 and which is resilient so as to yield when a can is compressed against it. The inner run of the timing belt 57 extends along the runway 11 opposite the belt 30, in an opening 58 in the runway side guide 13 and provides a continuation of this side guide. The belt 57 operates over a pair of longitudinally spaced pulleys 59 which are mounted on vertical shafts 61, 62 disposed adjacent the runway 11 and journaled in suitable bearings formed in the frame 15.

The shaft 62 is the driving shaft and carries a bevel gear 63 (Figs. 2 and 3) which meshes with and is driven by a bevel gear 64 on the gear shaft 40. Through this connection with the gear shaft 40, the timing belt 57 is driven in a counterclockwise direction as viewed in Fig. 1 so that the inner run of the belt travels in the same direction as the advancement of the cans B through the runway 11 and at a linear speed of substantially twice the linear speed of the transfer conveyor A in the runway.

Hence when an untimed can B is engaged by a land 54 of the timing and indexing belt 30 and is pressed against the moving belt 57 of the auxiliary timing device F as shown in Figs. 4 and 6, the auxiliary belt 57 rolls or rotates the compressed can B forward along the land 54 at a speed greater than the linear travel of the transfer conveyor A, until the can rolls off the leading beveled edge of the land and falls into the clearance recess 53 in advance of the land as shown in the dot and dash line position of the can in Fig. 4. This action repositions the can on the transfer conveyor A and locates it in timed relation with the feeding conveyor C.

As soon as the can falls into the advancement recess 53 it is free of the auxiliary timing belt 57 and the timing belt 30 and thus the can stops rolling and is returned to the control of the transfer conveyor A which continues the advancement of the repositioned and timed can toward the conveyor C for transfer thereto in time with the advancement of its feed dogs D. A stationary backing up plate 66 (Fig. 1) disposed adjacent the inner face of the inner run of the timing belt 30 retains the belt against outward displacement when a can rolls up onto a land 54 of the belt. The plate 66 is secured to the frame 15.

In this manner any untimed can B on the transfer conveyor A is accelerated in its advancement and is repositioned on the transfer conveyor in a proper timed and indexed position so that it will be transferred by the transfer conveyor A to the feeding conveyor C in proper position and time in front of the feed dogs D for advancement into the subsequent operation machine without arresting the advancement of the can. Under this continuous advancement of the can, even though it is at times accelerated, no spilling of the contents takes place.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In an apparatus for receiving random spaced containers in processional order and for arranging them in timed order for timed advancement, the combination of a transfer conveyor having frictional engagement with the random spaced containers for advancing them along a predetermined path of travel, a timing element moving continuously at substantially the same linear speed as said transfer conveyor and disposed adjacent one side of said transfer conveyor, said timing element having a recess for receiving containers correctly positioned in timed relation on said transfer conveyor, said timing element also having a projection disposed adjacent and following said recess for engaging and shifting an untimed container laterally of said transfer conveyor, an auxiliary timing element moving continuously at a greater linear speed than the linear speed of said timing element and disposed on the other side of said transfer conveyor and opposite said timing element and engageable by an untimed container shifted by said projection for gently accelerating the advancement of said untimed container relative to said transfer conveyor to reposition said untimed container on said transfer conveyor by advancing it longitudinally thereof into said recess in timed position, and means for actuating said transfer conveyor, said timing element and said auxiliary timing element in synchronism.

2. In an apparatus for receiving random spaced containers in processional order and for arranging them in timed order for timed advancement, the combination of a transfer conveyor having frictional engagement with the random spaced containers for advancing them along a predetermined path of travel, a timing element moving continuously at substantially the same linear speed as said transfer conveyor and disposed adjacent and extending along one side of said transfer conveyor, said timing element having a plurality of longitudinally spaced timing recesses for receiving containers correctly positioned in timed relation on said transfer conveyor, said recesses setting off between them on said element timing projections for engaging and shifting an untimed container laterally of said transfer conveyor, an auxiliary timing element moving continuously at a greater linear speed than the linear speed of said timing element and disposed on the other side of said transfer conveyor and opposite said timing element and engageable by an untimed container shifted by a said projection for gently accelerating the advancement of said untimed container relative to said transfer conveyor to reposition said untimed container on said transfer conveyor in timed position by advancing it longitudinally thereof into the recess immediately ahead of said projection, and means for actuating said transfer conveyor, said timing element and said auxiliary timing element in synchronism.

3. In an apparatus for receiving random spaced containers in processional order and for arranging them in timed order for timed advancement, the combination of a transfer conveyor having frictional engagement with the random spaced containers for advancing them along a predetermined path of travel, an endless timing belt moving continuously at substantially the same linear speed as said transfer conveyor and having a run disposed adjacent and extending along one side of said transfer conveyor, said timing belt having a plurality of longitudinally spaced timing recesses for receiving containers correctly positioned in timed relation on said transfer conveyor, said recesses setting off between them on said timing belt timing projections for engaging and shifting an untimed container laterally of said transfer conveyor, an auxiliary endless timing belt moving continuously at a greater linear speed than the linear speed of said timing belt and disposed on the other side of said transfer conveyor and opposite said timing belt and engageable by an untimed container shifted by a said projection for gently accelerating the advancement of said untimed container relative to said transfer conveyor to reposition said untimed container on said transfer conveyor in timed position by advancing it longitudinally thereof into the recess immediately ahead of said projection, and means for actuating said transfer conveyor, said timing belt and said auxiliary timing belt in synchronism.

4. In an apparatus for receiving round random spaced containers in processional order and for arranging them in timed order for timed advancement, the combination of a runway having longitudinal side guides for guiding containers in processional order along a predetermined path of travel, a transfer conveyor disposed in said runway and having frictional engagement with the random spaced containers for advancing them through said runway, a feeding conveyor having spaced feeding elements also disposed in said runway in longitudinal alignment with said transfer conveyor for receiving and advancing containers in timed relation, a pair of endless timing belts disposed one on each side of said transfer conveyor and opposite each other and having inner runs movable in the same direction of travel as said transfer conveyor and disposed in said runway as continuations of the side guides thereof, one of said timing belts being movable continuously at the linear speed of said transfer conveyor and having recesses spaced in accordance with the feeding elements on said feeding conveyor for receiving containers positioned on said transfer conveyor in timed relation to said feeding conveyor, said recesses setting off between them timing projections for pushing untimed containers into engagement with the other of said timing belts, said other timing belt operating at a linear speed greater than said first mentioned timing belt for rolling the untimed containers forward into the recesses immediately ahead of said engaged projections for repositioning the untimed containers into timed positions on said transfer conveyor for proper delivery to said feeding conveyor, and means for driving said conveyors and said belts in synchronism.

5. In an apparatus for receiving random spaced containers in processional order and for arranging them in timed order for timed advancement, the combination of a pair of endless timing belts having their inner runs disposed in spaced and parallel relation, means for actuating said belts and for actuating one of said belts at a linear speed greater than the other, a transfer conveyor disposed adjacent the inner runs of said belts for advancing the random spaced containers between said inner runs, longitudinally spaced recesses formed in one of said belts for receiving containers correctly positioned in timed relation on said transfer conveyor, said recesses setting off between them broad faced timing projections for compressing between said belts an untimed container to effect a rolling of said untimed container along said projection and into an adjacent recess to reposition said untimed container into a timed position on said transfer conveyor, and means for actuating said transfer conveyor at the linear speed of the belt having said recesses and said projections.

References Cited in the file of this patent

FOREIGN PATENTS

| Number | Country | Date |
|--------|---------|------|
| 599,936 | Great Britain | Mar. 24, 1948 |